US00RE42707E

(19) United States
(12) Reissued Patent
Bunoz

(10) Patent Number: US RE42,707 E
(45) Date of Reissued Patent: Sep. 20, 2011

(54) SOAP DISPENSING DEVICE

(75) Inventor: Etienne Bunoz, Hailsham (GB)

(73) Assignee: Brightwell Dispensers Limited, East Sussex (GB)

(21) Appl. No.: 12/153,810

(22) Filed: May 23, 2008

Related U.S. Patent Documents

Reissue of:
(64) Patent No.: 7,048,152
Issued: May 23, 2006
Appl. No.: 10/758,537
Filed: Jan. 16, 2004

(30) Foreign Application Priority Data

Mar. 5, 2003 (GB) ..... 0304948.3

(51) Int. Cl.
*B67D 5/06* (2006.01)
(52) U.S. Cl. ..... 222/182; 222/325; 222/105
(58) Field of Classification Search ..... 222/182, 222/181.1, 181.3, 214, 207, 327, 401, 183, 222/105, 325
See application file for complete search history.

(56) References Cited

U.S. PATENT DOCUMENTS

| | | | | |
|---|---|---|---|---|
| 4,463,876 | A * | 8/1984 | Swallert | 222/94 |
| 4,932,562 | A * | 6/1990 | Christine | 222/96 |
| 5,242,083 | A * | 9/1993 | Christine et al. | 222/96 |
| 5,862,956 | A * | 1/1999 | Brandenburg et al. | 222/214 |
| 6,305,580 | B1 * | 10/2001 | Chen | 222/162 |

FOREIGN PATENT DOCUMENTS

DE 296 01 918 7/1997

* cited by examiner

*Primary Examiner* — Kevin P Shaver
*Assistant Examiner* — Melvin A Cartagena
(74) *Attorney, Agent, or Firm* — Levy & Grandinetti

(57) ABSTRACT

A dispensing device comprising a base, a cover and a valve, in which the cover is releasably attached to the base by means of first hinge means, the movement of the cove defined by first hinge means operating the valve, and in which the cover is attached to the base by means of second hinge means, the movement of the cover defined by second hinge means exposing the base for loading or unloading a container of material to be dispensed, said movement defined by second hinge means only being possible when the cover is detached from the first hinge manes.

15 Claims, 2 Drawing Sheets

Figure 1:
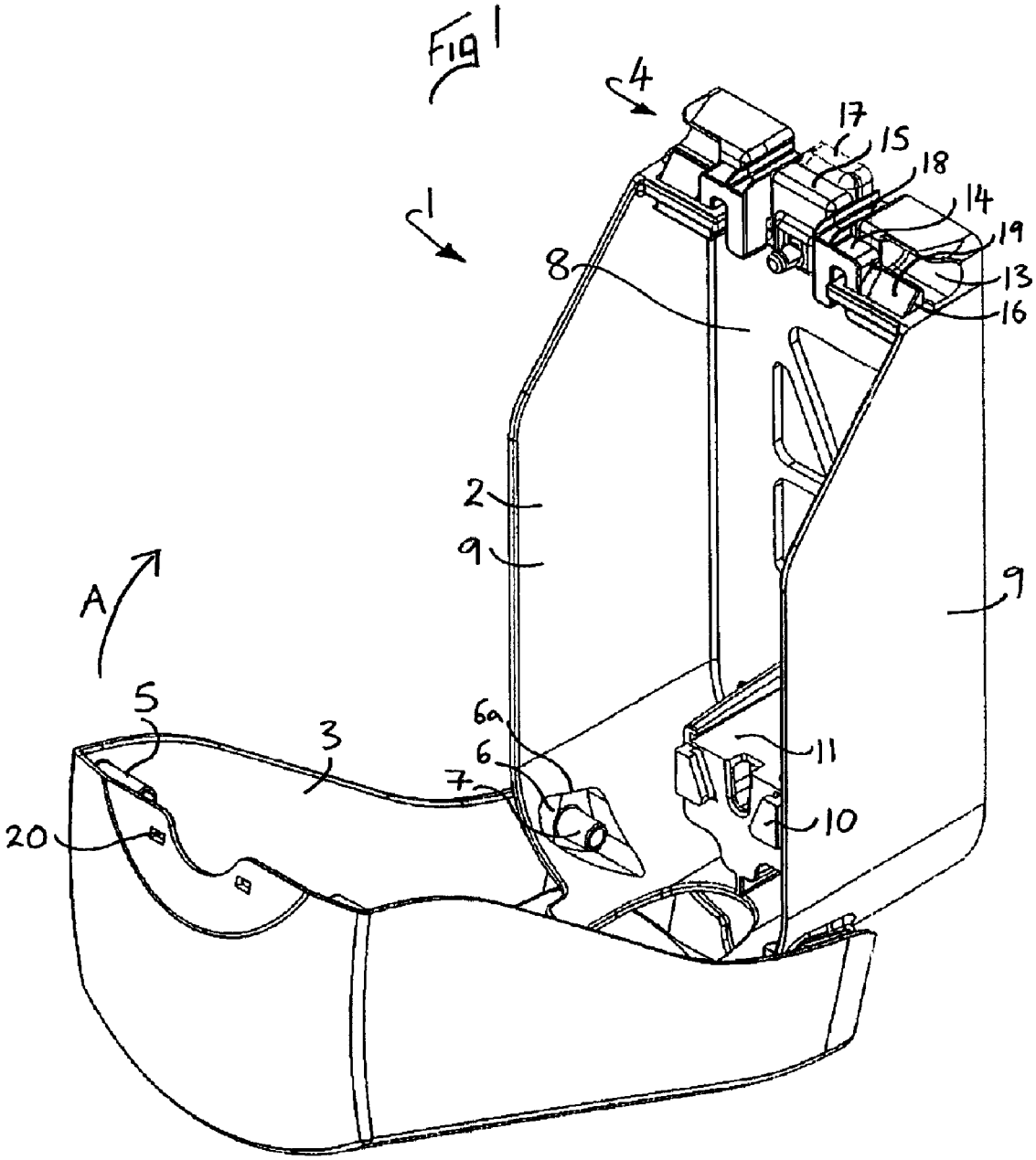

4
17
15
18
14
19
13
16
1
8
2
9
9
A
5
3
6a
6
7
11
10
20

17
20
1
3
2
21
B

SOAP DISPENSING DEVICE

Matter enclosed in heavy brackets [ ] appears in the original patent but forms no part of this reissue specification; matter printed in italics indicates the additions made by reissue.

I claim the benefit under Title 35, United States Code, §120 to Great Britain Application Number 0304948.3, filed Mar. 5, 2003, entitled SOAP DISPENSING DEVICE.

This invention relates to a dispensing device, particularly but not exclusively for dispensing pre-determined quantities of liquid hand soaps and preparations from disposable or reusable containers.

It is important to dispense a measured quantity of liquid hand soaps and preparations to avoid wastage. Further, it is often desired to dispense this material in a safe, clean and efficient manner. The materials to be dispensed are commonly supplied in a disposable or reusable sachet or box.

Many types of dispensing device are known which dispense material from a disposable container in a measured, safe and efficient manner. However, devices of this kind are commonly constructed from numerous components, and can be complex to build and dismantle. In particular, the mechanisms by which the material is dispensed, and a disposable container loaded and unloaded can require a proliferation of working parts.

The present invention is intended to provide a novel approach.

Therefore according to the present invention a dispensing device comprises a base, a cover and a valve, in which the cover is releasably attached to the base by means of first hinge means, the movement of the cover defined by first hinge means acting to operate the valve, and in which the cover is also attached to the base by second hinge means, movement of the cover defined by said second hinge means exposing the base for loading or unloading a container of material to be dispensed, said movement defined by the second hinge means being prevented unless the cover is detached from the first hinge means.

Preferably the base may be provided with a back plate provided with valve carrying means, and container carrying means adapted to position a container adjacent the valve for co-operation with it.

The valve can be of any know type which is adapted to dispense material when it is compressed, and be primed with a quantity of material to be dispensed when it is released. There are many known types of valve which operate in this way, and they will not be described further here.

In a preferred construction the movement of the cover defined by the first hinge means towards the base acts to compress the valve, and the movement away from the base acts to release the valve. Preferably the valve is provided with resilient means which acts against the compression.

In one embodiment the first hinge means can be provided at the top of the base, and the second hinge means can be opposite at the bottom.

Preferably the base and the cover may be provided with side walls, and the cover side walls being disposed outside the base side walls.

The first hinge means can comprise an assembly comprising two lateral sockets provided with resiliently mounted and trigger operated retention means, which are adapted to co-operate with two laterally extending first spigots provided on the inner surface of the walls of the cover. The retention means may comprise a retention member mounted on resilient means and provided with extensions adapted to retain the first spigots in the lateral sockets. The extensions can be provided with angled front surfaces, such that application of the first spigots against them lowers the retention member against the resilient means, and allows the first spigots to pass into the sockets. With this arrangement the cover can be pressed into place on the base.

To release the first spigots from the sockets and detach the cover from the first hinge means a manually operable and removable trigger portion can be provided which can be readily accessed.

In a preferred construction a second trigger can be provided in the form of troughs provided on the retention member, which can be accessed through slots provided in a top wall of the cover with a tool if the removable trigger portion described above is absent. The troughs can be dimensioned to allow their operation throughout the movement of the cover defined by second hinge means in which the first spigots move from the sockets to the front side of the extensions.

Preferably the second hinge means comprises sockets in the side walls of the base, which are adapted to co-operate with laterally extending second spigots provided on the inner surface of the side walls of the cover. The sockets can be provided with an extended upper edge, against which the second spigots can ride back and forth so as to define the limitation of the movement provided by the first hinge means.

In one construction the second hinge means is also releasable, so the cover can be completely removed from the base. This is facilitated by the cover and the base being constructed from a substantially rigid plastics material, which is provided with sufficient flexibility to allow the cover to be expanded and the base compressed to allow second spigots to be removed from the second hinge means sockets.

Figure 2:
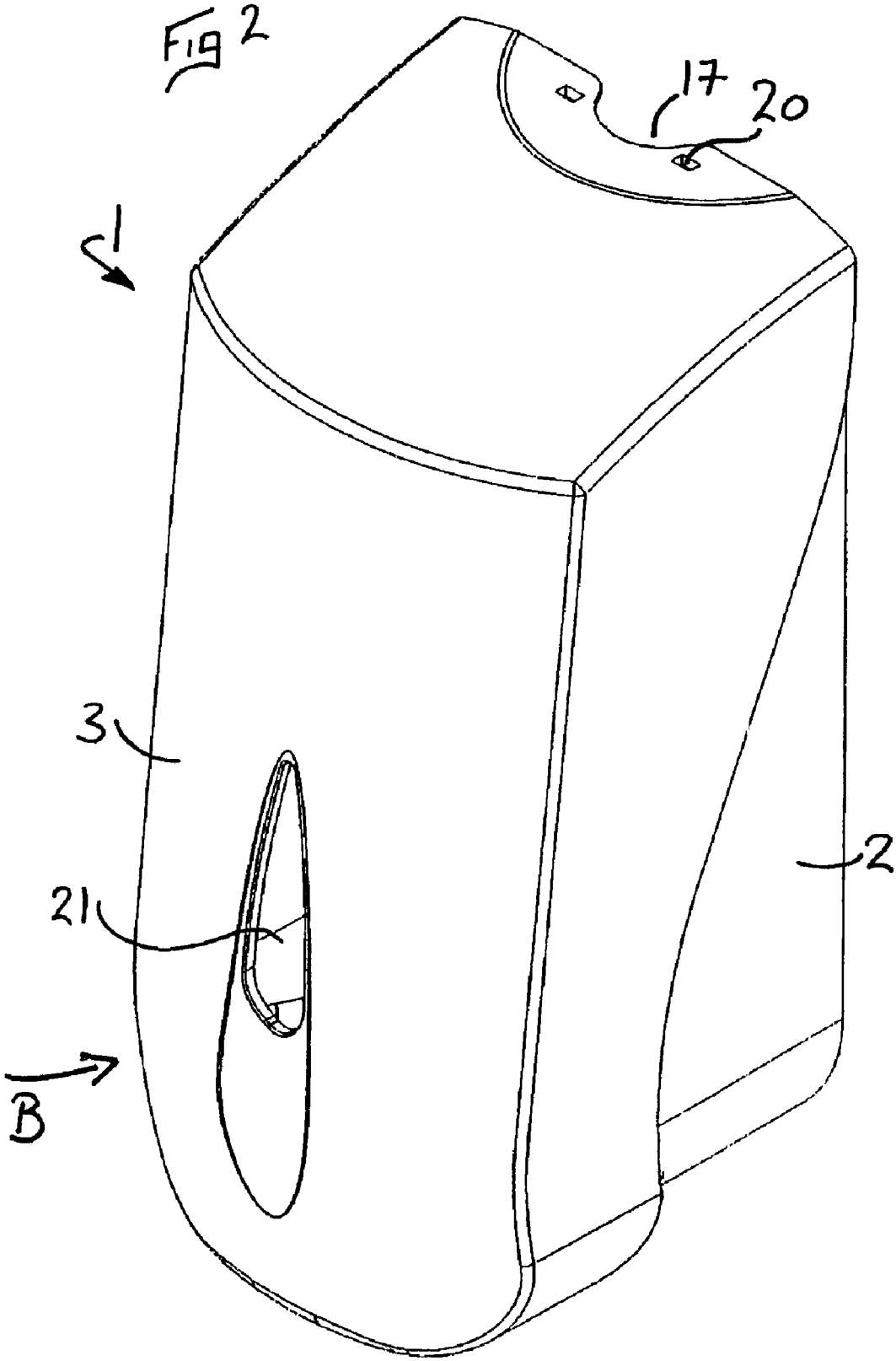

The invention can be performed in various ways, but one embodiment will now be described by way of example, and with reference to the accompanying drawings, in which:

FIG. 1 is a perspective view of a dispensing device according to the present invention in a first arrangement; and, FIG. 2 is a perspective view of the dispensing device as shown in FIG. 1 in a second arrangement.

In FIG. 1 dispenser 1 comprises base 2, cover 3 and valve (not shown). The cover 3 is releasably attachable to the base 2 by means of first hinge assembly 4 and first spigots 5, the movement of the cover 3 defined by first hinge means acting to operate the valve, as described below.

The cover 3 is also attached to the base 2 by second hinge means, in the form of sockets 6 and second spigots 7, the movement of the cover 3 defined by the second hinge means exposing the base 2 for loading or unloading a container of material to be dispensed (not shown), said movement being prevented unless the cover 3 is detached from the first hinge assembly 4, as described below.

The base 2 comprises a wall mountable back plate 8, side walls 9, valve mounting 10, container mounting 11 and first hinge assembly 4.

The first hinge assembly 4 comprises lateral sockets 13, resiliently mounted retention member 14 and support member 15. The retention member 14 is provided with extensions 16, first removable operating trigger 17 and second operating trigger means in the form of troughs 18. The extensions 16 are provided with an angled front surface 19.

The cover 3 comprises a single component which substantially surrounds the base when fully attached, as shown in FIG. 2. It further comprises second operating trigger means slots 20.

In use the dispenser is first opened as shown in FIG. 1. The cover 3 is attached to the base 2 by means of sockets 6 and second spigots 7. A valve (not shown) is mounted on mounting 10, and a container (not shown) of material to be dispensed is mounted on mounting 11.

The cover 3 is then rotated about the second hinge means, and the spigots 5 are brought into contact with the first hinge assembly 4, in the direction of arrow A. The first spigots 5 ride the angled front surfaces 19 of the extensions 16, forcing the retention member 14 down. Once the spigots 5 pass the extensions 16, the member 14 rises, and holds the spigots 5 in place in the sockets 13.

The valve (not shown) is provided with a resilient priming and dispensing mechanism, in which the valve is adapted to dispense material when it is compressed, and be primed with material to be dispensed when it is released. When the cover 3 is pressed in the direction of arrow B as shown in FIG. 2, the valve is compressed, and material is dispensed downwards from the dispenser 1. When the cover 3 is released, the valve expands under pressure from its resilient means, which pushes the cover 3 back out, and primes the valve with the next portion of material to be dispensed.

The rotational movement of the cover 3 about the first hinge means as described above is limited, thereby to compress the valve a pre-determined amount to dispense a desired quantity of material. The movement of the cover 3 is limited by the shape of sockets 6. When the cover 3 is attached to the first hinge assembly 4, the second spigots 7 are disposed adjacent the upper edge 6a of the sockets 6 (visible in FIG. 1). The spigots 7 are therefore able to ride back and forth along the length of the upper edge 6a.

The cover 3 is further provided with a viewing aperture 21, through which the container can be viewed, and the remaining contents therein determined.

To remove the container for replacement, the trigger 17 is depressed, which lowers the retention member 14 and its extensions 16, which allows the spigots 5 to be removed from the sockets 13, and the cover 3 can be rotated about the second hinge means until it reaches the arrangement as shown in FIG. 1. The container and/or the valve can then be removed and/or replaced.

The trigger 17 is formed from a cap, which can be removed from the retention member 14. If the cover 3 is to be removed from the hinge assembly 4 when the trigger 17 has been removed, the troughs 18 can be accessed with a suitable tool through the slots 20. The retention member 14 must be lowered for the duration of the spigot's 5 movement from the back of the sockets 13 to the front side of the extensions 16. Therefore, troughs 18 are long enough to allow the retention member 14 to be accessed through the slots 20 throughout this rotational movement.

The cover 3 and the base 2 are constructed from a rigid plastics material. However, the material is provided with sufficient resilience to allow the second spigots 7 to be removed from the sockets 6 when the cover 3 is expanded and the base 2 is compressed. This allows the dispenser to be completely dismantled for servicing or cleaning.

Thus, a dispenser is provided which can dispense a predetermined quantity of material in a clean, safe and efficient manner, but which is constructed from the minimum number of parts. Further, a dispenser in which movement of the cover operates the valve is provided with a novel loading mechanism, which allows ready access to the internal compartment.

The invention claimed is:

1. A dispensing device comprising a base, a cover and a valve, in which the cover is releasably attached to the base by means of first hinge means, movement of the entire cover defined by first hinge means acting to operate the valve, and in which the cover is also attached to the base by second hinge means, the movement of the cover defined by said second hinge means exposing the base for loading or unloading a container of material to be dispensed, said movement defined by the second hinge means being prevented unless the cover is detached from the first hinge means, *and in which the dispensing device is provided with retention means adapted to prevent the release of the cover from the first hinge means until a resiliently biased trigger member is depressed*.

2. A dispensing device according to claim 1 in which the base is provided with a back plate provided with valve carrying means, and container carrying means adapted to position a container adjacent the valve for co-operation therewith.

3. A dispensing device according to claim 2 in which the valve is adapted to dispense material when it is compressed, and be primed with material to be dispensed when it is released, and in which the movement of the cover defined by first hinge means in a first direction acts to compress the valve, and in a second opposite direction acts to release the valve.

4. A dispensing device according to claim 3 in which the first hinge means are disposed at a first end of the base, and the second hinge means are disposed at an opposite second end of the base.

5. A dispensing device according to claim 4 in which the base is provided with side walls, and the cover is also provided with side walls, which are disposed outside the side walls provided on the base in use.

6. A dispensing device according to claim 5 in which the first hinge means comprises an assembly comprising two lateral sockets [provided with resiliently mounted and trigger operated retention means, which are adapted to co-operate with two laterally extending first spigots provided on the inner surface of the walls of the cover] *said retention means and two laterally extending first spigots provided on the inner surface of the walls of the cover, in which the retention means comprises a retention member mounted on resilient means and provided with extensions adapted to retain the first spigots in the lateral sockets*.

[7. A dispensing device according to claim 6 in which the retention means comprises a retention member mounted on resilient means and provided with extensions adapted to retain the first spigots in the lateral sockets.]

8. A dispensing device according to claim [7] *6* in which the extensions are provided with angled front surfaces, such that application of the first spigots against the surfaces lowers the retention member against the resilient means, and allows the first spigots to pass into the sockets.

9. A dispensing device according to claim 8 in which the retention member is provided with a manually operable and removable trigger portion.

10. A dispensing device according to claim 9 in which the retention member is provided with second trigger means in the form of troughs, which are operable by means of a tool passed through slots provided in a top wall of the cover, and in which the troughs are dimensioned to allow their operation throughout the movement of the cover defined by second hinge means in which the first spigots move from the sockets to the front side of the extensions.

11. A dispensing device according to claim 6 in which the second hinge means comprises sockets in the side walls of the base, which are adapted to co-operate with laterally extending second spigots provided on the inner surface of the side walls of the cover.

12. A dispensing device according to claim 11 in which the second hinge means sockets are provided with an extended upper edge, against which the second spigots can ride back and forth so as to define the limitation of the movement provided by the first hinge means.

13. A dispensing device according to claim 12 in which the second hinge means is releasable, such that the cover can be completely removed from the base.

14. A dispensing device according to claim 13 in which the cover is provided with a viewing aperture.

15. A dispensing device according to claim 14 in which the components are constructed from a substantially rigid plastics material.

16. A dispensing device according to claim 15 in which the substantially rigid plastics material is provided with sufficient flexibility to allow the cover to be expanded and the base compressed to allow second spigots to be removed from the second hinge means sockets.

* * * * *